(12) United States Patent
Bürger

(10) Patent No.: US 7,551,066 B1
(45) Date of Patent: Jun. 23, 2009

(54) METHOD AND SYSTEM FOR TRANSMITTING DATA FOR A SECURITY SYSTEM OF A MOTOR VEHICLE

(75) Inventor: Thorsten Bürger, Schwalbach (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/465,676

(22) Filed: Dec. 17, 1999

(30) Foreign Application Priority Data

Dec. 21, 1998 (DE) ................. 198 60 311
Jan. 21, 1999 (DE) ................. 199 02 983

(51) Int. Cl.
*B60R 25/10* (2006.01)
(52) U.S. Cl. .................... 340/426.36; 340/426.28; 340/428
(58) Field of Classification Search ........... 455/411, 455/124; 340/5.26, 5.72, 5.54, 426.36, 428, 340/426.28
See application file for complete search history.

(56) References Cited

U.S. PATENT DOCUMENTS

| | | | |
|---|---|---|---|
| 5,241,598 A * | 8/1993 | Raith | 380/248 |
| 5,543,776 A * | 8/1996 | L'Esperance et al. | 340/426.25 |
| 5,552,641 A | 9/1996 | Fischer et al. | |
| 5,682,032 A | 10/1997 | Philipp | |
| 6,031,465 A * | 2/2000 | Burgess | 340/5.54 |
| 6,154,544 A * | 11/2000 | Farris et al. | 380/262 |
| 6,323,566 B1 * | 11/2001 | Meier | 307/10.2 |
| 6,606,492 B1 * | 8/2003 | Losey | 455/411 |

FOREIGN PATENT DOCUMENTS

| | | |
|---|---|---|
| EP | 0843425 | 5/1998 |
| WO | 9218732 | 10/1992 |
| WO | 0015931 | 3/2000 |

* cited by examiner

*Primary Examiner*—Temica M. Beamer
(74) *Attorney, Agent, or Firm*—Martin A. Farber

(57) ABSTRACT

A method for transmitting data for a security device, in particular for access authorization systems and/or driving authorization systems of a motor vehicle, in which data are transmitted over the air from a transmitter unit to a receiver unit.

In a method in which, despite contactless interrogation of the identification signal transmitter, an authorizing access information item cannot be obtained by a third party, the data are transmitted, after capacitive coupling of the transmitter unit and receiver unit, from the transmitter to the receiver using a signal which is generated by a capacitive alternating field.

8 Claims, 2 Drawing Sheets

METHOD AND SYSTEM FOR TRANSMITTING DATA FOR A SECURITY SYSTEM OF A MOTOR VEHICLE

FIELD AND BACKGROUND OF THE INVENTION

The invention relates to a method for transmitting data for a security device, in particular for access authorization systems and/or driving authorization systems of a motor vehicle, in which data are transmitted over the air from a transmitter unit to a receiver unit, and a system for activating and/or deactivating a security device.

The publication WO 92/18732 of this generic type discloses a device for operating a door-lock system and/or alarm system in which the user carries a movable transmitter in which an encoded information item for activating or deactivating the aforesaid security devices is stored. Arranged in the motor vehicle is a receiver device which receives the high-frequency signal transmitted over the air by the transmitter, and compares it with a reference code which is stored in it. When these information items correspond, a signal is output to the door-lock system and/or alarm system.

The transmitter signal is transmitted only if the person carrying the transmitter is at a predefined distance from the motor vehicle, which distance lies within the range of the transmitter.

The transmitter is activated here by means of a signal from the receiver without manual intervention of the user. When the high-frequency radio link is used, the information item is modulated onto a carrier frequency which is in the megahertz or gigahertz range.

However, the advanced telecommunications possibilities also permit the identification code to be interrogated in a contactless fashion over relatively large distances, unnoticed by the vehicle owner, and to be transmitted to the motor vehicle without the vehicle owner being aware of it.

SUMMARY OF THE INVENTION

The invention is thus based on the object of providing a method in which, despite contactless interrogation of the identification signal transmitter, third parties cannot obtain authorizing access information.

The object is achieved according to the invention in that, after capacitive coupling of the transmitter unit and receiver unit, the data are transmitted from the transmitter to the receiver using a signal which is generated by a capacitive alternating field.

The advantage of the invention consists in the fact that the transmission link does not come into operation until the user, who is carrying the identification signal transmitter on his person, comes very close, up to a few millimeters. As a result, a high degree of operational security against tampering by third parties is obtained, in particular misuse through lengthening transmission link distances through relays (relay attack) is advantageously prevented. The transmission of data and thus identification is restricted to the immediate vicinity of the user.

After reception of the signal, the transmitter will advantageously transmit an encoded information item to the receiver on a second wireless transmission link, which information item is compared with a predefined encoded information item in the receiver, a drive signal for the security device being output when said items correspond.

The plausibility check of the encoded information item is only carried out, in a manner known per se, in the receiver of the motor vehicle once the identification transmitter has been woken up by the start signal and identified itself.

The second transmission link which is provided for the encoded information item is implemented here by means of inductive coupling or far-field coupling.

In another refinement of the invention, a system for activating and/or deactivating a security device, in particular for access authorization systems and/or driving authorization systems of a motor vehicle is provided, in which an encoded information item is transmitted over the air between a portable transmitter and a receiver, the receiver device comparing the received information item with a predefined encoded information item, and outputting a drive signal to the security device when these two information items correspond.

In order to achieve the present object, the receiver has a capacitive transmitter unit in which a first capacitor is operated with an alternating current generator, the transmitter having, for the reception of the encoded information, a second capacitor which, after capacitive coupling has taken place, receives the signal generated by the transmitter unit of the receiver and passes it on to an evaluation device of the transmitter.

This makes it impossible, even in such a device, for the encoded start signal to be monitored without being noticed.

In a development, after the start signal has been evaluated, the evaluation device generates an encoded information item which is transmitted from a transmitter unit of the transmitter to a receiver unit of the receiver by means of a far-field coupling.

The encoded information item is modulated onto a high-frequency carrier frequency generated by the alternating current generator.

The field of action of a capacitive transmission can be restricted to specific areas. The first capacitor is thus formed between the outer shell of an accessed device and an activation device which is arranged on the outer shell of the accessed device. As a result, the start signal is not generated until the user activates, for example, the door handle of the motor vehicle.

In order to monitor whether the correct identification signal transmitter is present for an immobilizer, the first capacitor is formed between the vehicle bodywork and a control element located in the interior of the vehicle. This control element may be, for example, the transmission shift lever of a motor vehicle.

The signal which is to be detected by the second capacitor is advantageously amplified by the user making contact with the activation device or with the control element. Owing to the high level of conductivity of the human body, it acts as a capacitor electrode with a large surface for the first capacitor, and thus as a transmission medium. This ensures that the second capacitor which is arranged on the identification signal transmitter reliably perceives the changes in capacitance of the first capacitor.

BRIEF DESCRIPTION OF THE DRAWING

The invention permits numerous possible embodiments. One of them will be explained with reference to the figures illustrated in the drawings, in which.

Identical features are identified with identical reference symbols.

DETAILED DESCRIPTION OF THE PREFERRED EMBODIMENT

Figure 1:
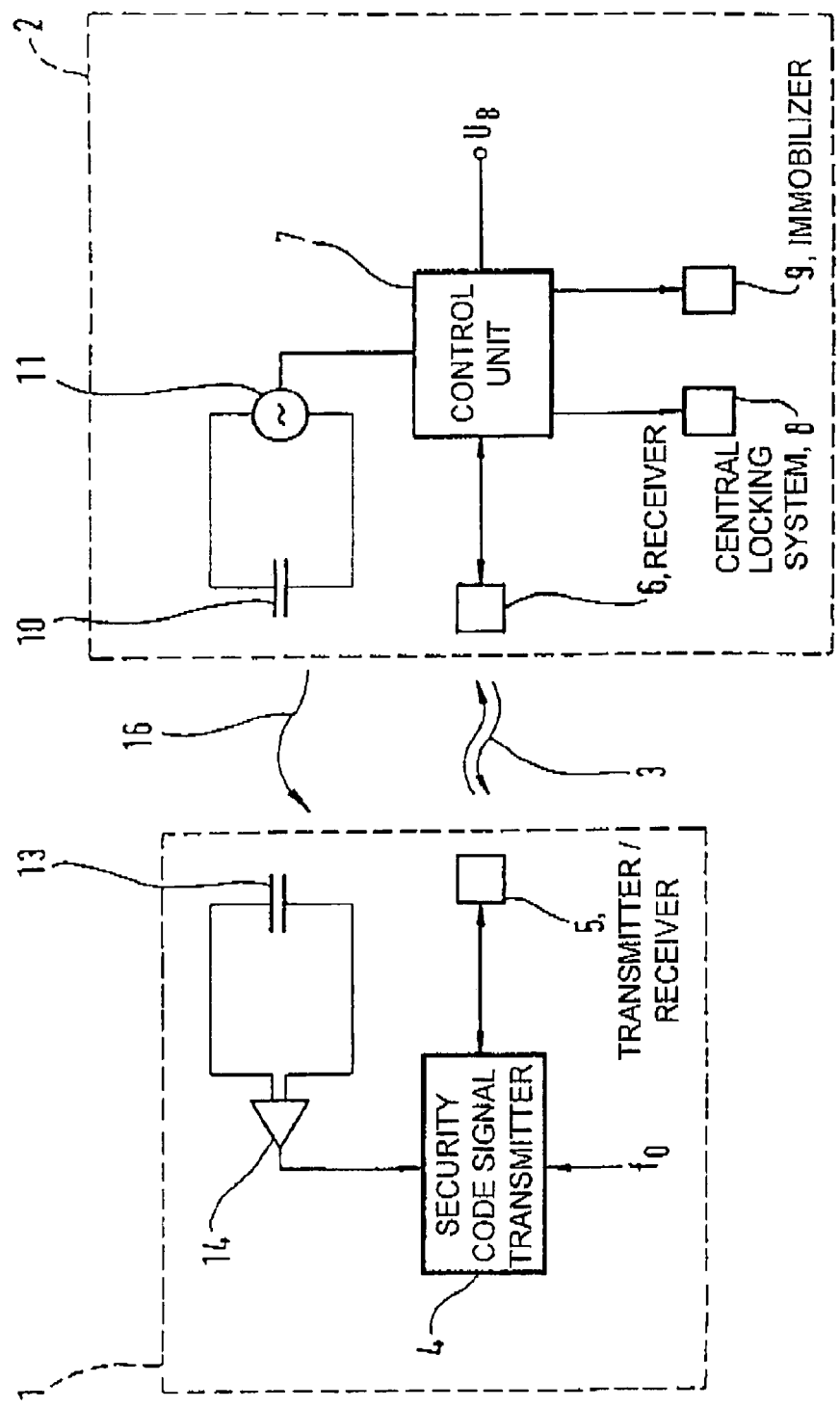
FIG. 1: shows an antitheft device according to the invention.

In the vehicle access systems and vehicle authorization systems which are currently in development, a contactless interrogation of an identification signal transmitter makes opening and starting a vehicle significantly more convenient. The identification signal transmitter can be carried here anywhere on the body (for example in a trouser pocket or a jacket pocket) and does not have to be explicitly operated.

Such a security device is composed of a portable transmitter 1 and a receiver device 2 which are permanently installed in a motor vehicle (not illustrated further). High-frequency radio signals 3 are exchanged in a contactless fashion between the transmitter 1 and the receiver device 2.

The transmitter 1 is composed here of a security code signal transmitter 4 in which the encoded information item is modulated onto a carrier frequency $f_0$ of approximately 400 MHz. The security information which is generated in this way is passed onto a transmitter/receiver device 5 which is embodied as an antenna in the case of the transmitted radio signals 3. A receiver device 6, also embodied as an antenna, of the receiver device 2 receives the radio signal 3 and passes it on to a control unit 7 of the motor vehicle which compares the encoded signal with a reference code signal stored in it. When these two information items correspond, the control unit 7 outputs a drive signal either to the central locking system 8 of the motor vehicle in order to open or close the vehicle doors and/or to a immobilizer 9 in order to activate or deactivate the drive of the motor vehicle.

The transmission of the encoded information is, however, initiated by the transmitter 1 only if the transmitter 1 receives a start signal 16 from the receiver device 2.

In order to generate the start signal 16, a capacitor 10, which is operated with an alternating current generator 11, is arranged in the receiver device 2. This alternating current generator 11 can be activated continuously or only at predefined time periods. In order to transmit data simultaneously, a signal which contains the data can be modulated onto the carrier frequency which is generated by the alternating current generator.

Figure 2:
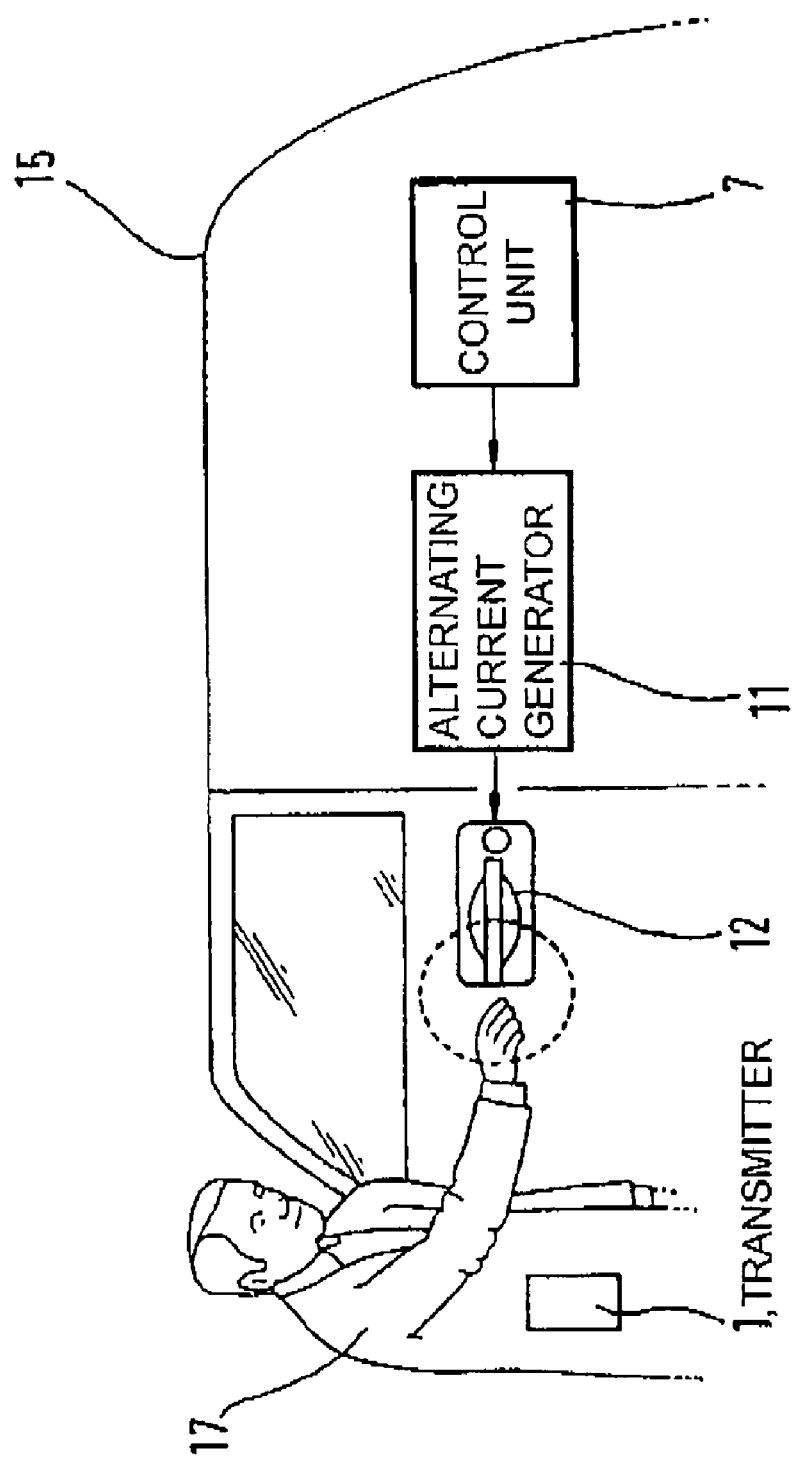
FIG. 2: shows an embodiment of a capacitive field.

As is clear from FIG. 2, the capacitor electrodes of the capacitor 10 are formed by the vehicle bodywork 15 and a metal plate 12 and let into a door handle of the motor vehicle.

Similarly, a capacitor 13, which is connected to the reference code signal transmitter 4 via an amplifier device 14, is also located in the transmitter device 1.

The start signal 16 is generated in the following way: if the user approaches the motor vehicle, the capacitor 13 of the transmitter 1 will move, when in the direct vicinity of the door handle, or when he touches it, into the electrical field which is built up by the capacitor 10 between the door handle and the vehicle bodywork. As a result of the continuous change in this field owing to the driving by means of the alternating current generator, the variation in the field is detected by the capacitor 13 of the transmitter unit 1. Said capacitor 13 generates a signal which corresponds to the changes and which is amplified by the amplifier 14 and passed onto the reference code signal transmitter 4, which is preferably embodied as a microcontroller.

This effect is amplified further by virtue of the fact that the user 17 himself serves as a transmission link between the transmitter 1 and receiver 2 by virtue of the fact that the capacitive coupling is amplified even further by the conductivity of his body.

It is possible to dispense completely with presence detectors such as are used to trigger the start signal.

I claim:

1. A system for activating and/or deactivating a security device, in particular for access authorization systems and/or driving authorization systems of a motor vehicle, in which system an encoded information item is transmitted over air between a portable transmitter and a receiver, the receiver comparing the received information item with a predefined encoded information item, and outputting a drive signal to the security device when said two information items correspond, wherein the receiver (2) has a capacitive transmitter unit (10, 11) comprising a first capacitor and generates a start signal (16) by means of an alternating electric field at the first capacitor, a receiver unit (13) of the transmitter (1) comprises a second capacitor for reception of the start signal, and transmission of the start signal from the first capacitor to the second capacitor is accomplished by a capacitive coupling between the first and the second capacitors.

2. The system as claimed in claim 1, wherein, in the capacitive transmitter unit (10, 11) of the receiver (2), the first capacitor (10) is operated with an alternating current generator (11), and the second capacitor (13) receives the signal generated by the transmitter unit (10, 11) of the receiver (2) and passes it on to an evaluation device (4) of the transmitter (1).

3. The system as claimed in claim 2, wherein, after evaluation of the start signal (16), the evaluation device (4) generates the encoded information item (3) which is transmittable from a transmitter unit (5) of the transmitter (1) to a receiver unit (6) of the receiver (2) by means of inductive coupling or far-field coupling.

4. The system as claimed in claim 1, wherein the encoded information item (3) is modulated onto a high-frequency carrier frequency which is generated by an alternating current generator (11).

5. The system as claimed in claim 2, wherein the first capacitor (10) is formed between an outer shell (15) of an access device and an activation device (12) which is arranged on the outer shell of the access device.

6. The system as claimed in claim 2, wherein the first capacitor (10) is formed between bodywork of the vehicle and a control element which is arranged in the interior of the motor vehicle.

7. The system as claimed in claim 5, wherein, when the activation device (12) is touched by the user, the signal which is to be detected by the second capacitor (13) is amplified.

8. The system as claimed in claim 6, wherein, when the control element is touched by the user, the signal which is to be detected by the second capacitor (13) is amplified.

* * * * *